_United States Patent_ [19]

Brown et al.

[11] Patent Number: 6,134,899
[45] Date of Patent: Oct. 24, 2000

[54] REFRIGERANT RECOVERY AND RECHARGING SYSTEM WITH AUTOMATIC AIR PURGING

[75] Inventors: William C. Brown, Bryan; Walter D. Murray, Pioneer; Gary P. Murray, Montpelier, all of Ohio

[73] Assignee: SPX Corporation, Muskegon, Mich.

[21] Appl. No.: 09/273,213

[22] Filed: Mar. 19, 1999

[51] Int. Cl.$^7$ .................................................. F25B 43/04
[52] U.S. Cl. ................................ 62/195; 62/77; 62/149; 62/126
[58] Field of Search .............................. 62/149, 195, 77, 62/85, 475, 126

[56] References Cited

U.S. PATENT DOCUMENTS

| | | |
|---|---|---|
| 4,261,178 | 4/1981 | Cain . |
| 4,363,222 | 12/1982 | Cain . |
| 4,364,236 | 12/1982 | Lower et al. . |
| 4,441,330 | 4/1984 | Lower et al. . |
| 5,127,239 | 7/1992 | Manz et al. . |
| 5,172,562 | 12/1992 | Manz et al. . |
| 5,181,391 | 1/1993 | Manz ................................ 62/195 X |
| 5,182,918 | 2/1993 | Manz et al. . |
| 5,193,351 | 3/1993 | Laukhuf et al. . |
| 5,209,077 | 5/1993 | Manz et al. . |
| 5,231,842 | 8/1993 | Manz et al. . |
| 5,388,416 | 2/1995 | Manz et al. .............................. 62/85 |
| 5,517,825 | 5/1996 | Manz et al. ........................... 62/195 X |
| 5,582,023 | 12/1996 | O'Neal .................................. 62/195 |
| 5,664,424 | 9/1997 | Olds ..................................... 62/85 |
| 5,906,106 | 5/1999 | Brown et al. ............................ 62/195 |

Primary Examiner—William Doerrler
Assistant Examiner—Chen-Wen Jiang
Attorney, Agent, or Firm—Price, Heneveld, Cooper, Dewitt & Litton

[57] ABSTRACT

Conduits are coupled to a supply tank of refrigerant to allow the sensing of the amount of air present in the refrigerant tank and, upon the detection of air, the purging of air from the tank with a minimal loss of refrigerant. Preferably, the conduits include flow restrictors such as orifices and solenoid valves controlled by a microprocessor to sequentially sample and purge air from the refrigerant tank as required.

26 Claims, 3 Drawing Sheets

REFRIGERANT RECOVERY AND RECHARGING SYSTEM WITH AUTOMATIC AIR PURGING

BACKGROUND OF THE INVENTION

The present invention relates to a refrigerant recovery and recharging system and particularly one for use with vehicle air conditioning systems and which includes automatic purging of air from the supply of refrigerant.

In recent years, the maintenance of vehicle refrigerant systems has been accomplished utilizing closed-circuit recovery devices that prevent the discharge of refrigerant into the atmosphere. Such systems are typically self-contained units with the capability of recovering the refrigerant from the vehicle, filtering contaminants from the refrigerant, and subsequently recharging the system. The equipment used also evacuates the vehicle's refrigerant system prior to recharging. In the past, add-on adapters requiring significant operator interaction and control were required for the filtering of refrigerant during the process. Alternatively, a separate unit was employed for the filtering of refrigerant to remove contaminants, such as water, oil, metal shavings and the like. Such prior methods and equipment were costly and time consuming to use and subject to operator mistake. The flushing and filtering of refrigerants is well known. An improved system, providing an indication when the filtering has been achieved is disclosed in U.S. Pat. No. 5,211,024, the disclosure of which is incorporated herein by reference. A system that accomplishes the flushing process with the remaining recovery evacuation and recharging steps is disclosed in concurrently filed U.S. patent application Ser. No. 09/272,868, filed on Mar. 19, 1999, and entitled REFRIGERANT RECOVERY AND RECHARGING SYSTEM WITH AUTOMATIC FLUSHING, the disclosure of which is incorporated herein by reference.

With refrigerant recovery and recharging systems of all types, the connecting and disconnecting of hoses to and from the refrigerant circuit, such as a vehicle's air conditioning system, allows the entry of a small amount of air into the system which ultimately is collected in the main refrigerant tank during recovering, recycling and flushing cycles of operation. Further, the changing of refrigerant supply tanks may also result in a small amount of contaminant, such as air, being introduced into the system. The air collects in the refrigerant supply tank, typically as a gas, above the liquefied refrigerant in the pressurized tank. In the past, a mechanical air purge valve has been employed to bleed air from the refrigerant tank which process was performed while a vacuum was being pulled on the refrigerator circuit being serviced. The process took nearly 10 minutes during a cycle of operation and proves inadequate when the vacuum time was relatively short or if an extreme amount of air was present. Further, such prior art methods would not provide the user with an indication of the amount of air present in the system.

A portable hand-held system has been employed which overcomes some of the deficiencies of the prior art system and is disclosed in U.S. patent application Ser. No. 08/957,185, filed on Oct. 24, 1997, and entitled REFRIGERANT AIR ANALYZER AND PURGE SYSTEM. With such a system, the amount of air is sensed and can be bleed from the system by connecting to the main refrigerant supply tank. Although such a system is an improvement over the prior mechanical methods employed, there remains a need for an air purging system which is integral with the service unit and which can automatically be employed to purge air from the main refrigerant tank without the need for connecting additional equipment to the service unit and with minimal operator intervention.

SUMMARY OF THE INVENTION

The system of the present invention accomplishes these goals by providing first and second conduits coupled to the main refrigerant tank of the service module which allow the sensing of the amount of air present in the main refrigerant tank and subsequently, upon the detection of air, allowing the purging of air from the tank with a minimal loss of refrigerant. In the preferred embodiment of the invention, the conduits include flow restrictors such as orifices and include solenoid valves controlled by a microprocessor to sequentially sample and purge air as required from the refrigerant tank. In a preferred embodiment of the invention also, there is provided a flow path for atmospheric air to flow through an oxygen or nitrogen sensor for calibration of the system prior to the sampling of the refrigerant supply tank.

With such a system, therefore, air purging can be accomplished and used with any refrigerant servicing unit and can be achieved when the service unit is not in use since it requires no operator intervention. Such a system thereby facilitates the supply of pure, uncontaminated refrigerant for use in servicing a refrigerant circuit, such as the air conditioning unit of a vehicle, reduces the entry of contaminants, such as air, into the circuit by providing an integrated purging system which does not require operator connection to the service unit and can be operated at a time when the service unit is idle and not being employed for recovery and recharging of a refrigeration circuit.

These and other features, objects and advantages of the present invention will become apparent to those skilled in the art upon reading the following description thereof together with reference to the accompanying drawings.

DETAILED DESCRIPTION OF THE PREFERRED EMBODIMENT

Figure 1:
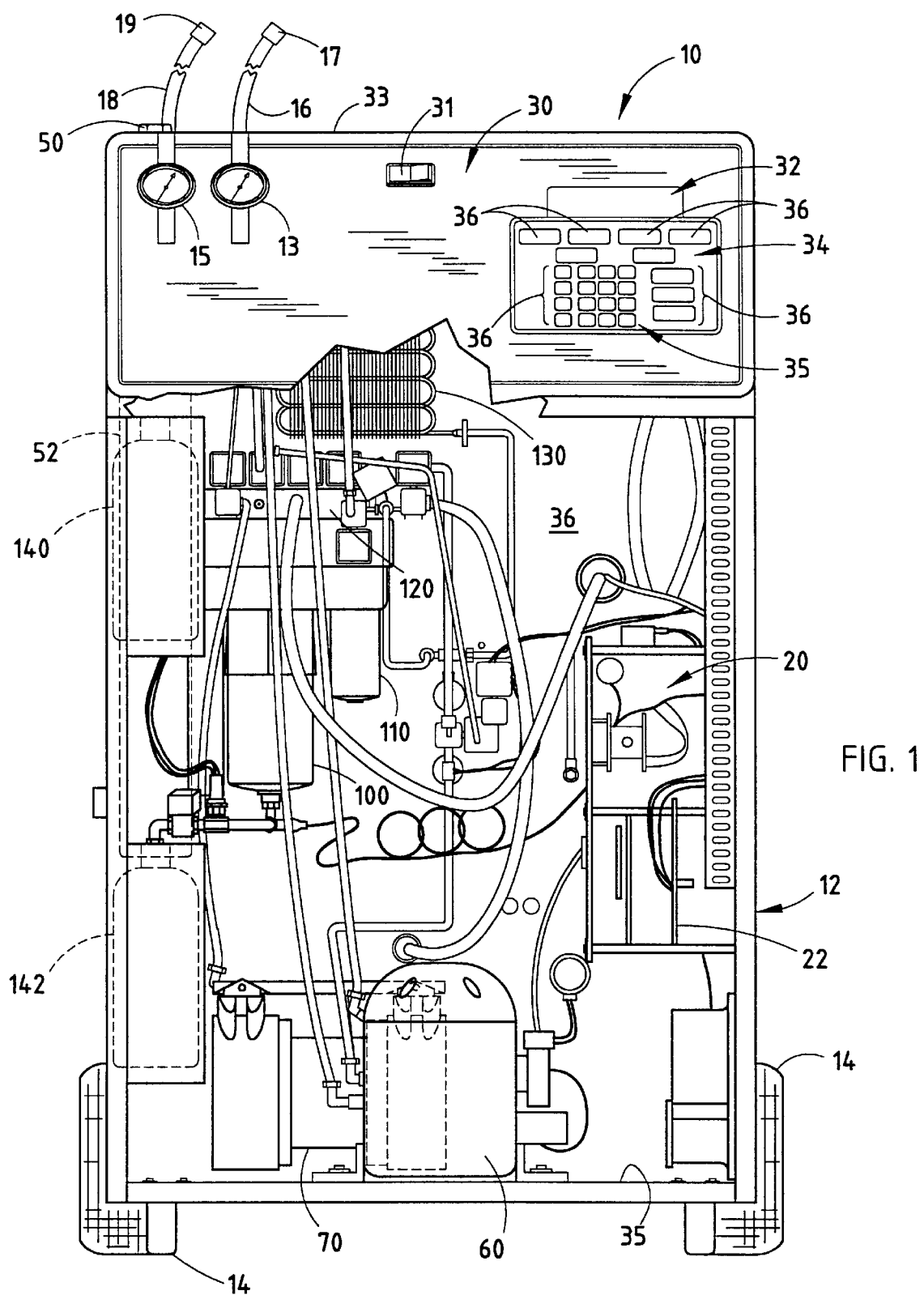
FIG. 1 is a front elevational view, partly broken away, of a refrigerant maintenance unit that incorporates the present invention.

Referring initially to FIG. 1, there is shown a maintenance unit 10 for coupling to a refrigerant circuit such as a vehicle's air conditioning system for its maintenance. The unit 10 comprises a portable machine mounted within a cabinet 12 supported by a pair of wheels 14, such that it can be conveniently moved to the situs of a vehicle. Unit 10 includes a high pressure hose 16, typically color coded red, with a coupling 17 for coupling to the vehicle's high pressure port and a low pressure hose 18, typically color coded blue, having a coupling 19 for coupling to the low pressure port of the vehicle's refrigerant circuit. The front panel of the cabinet is shown broken away in FIG. 1 to show the major elements of the system which are also identified by similar numbers in the flow diagram of FIG. 2.

Figure 2:
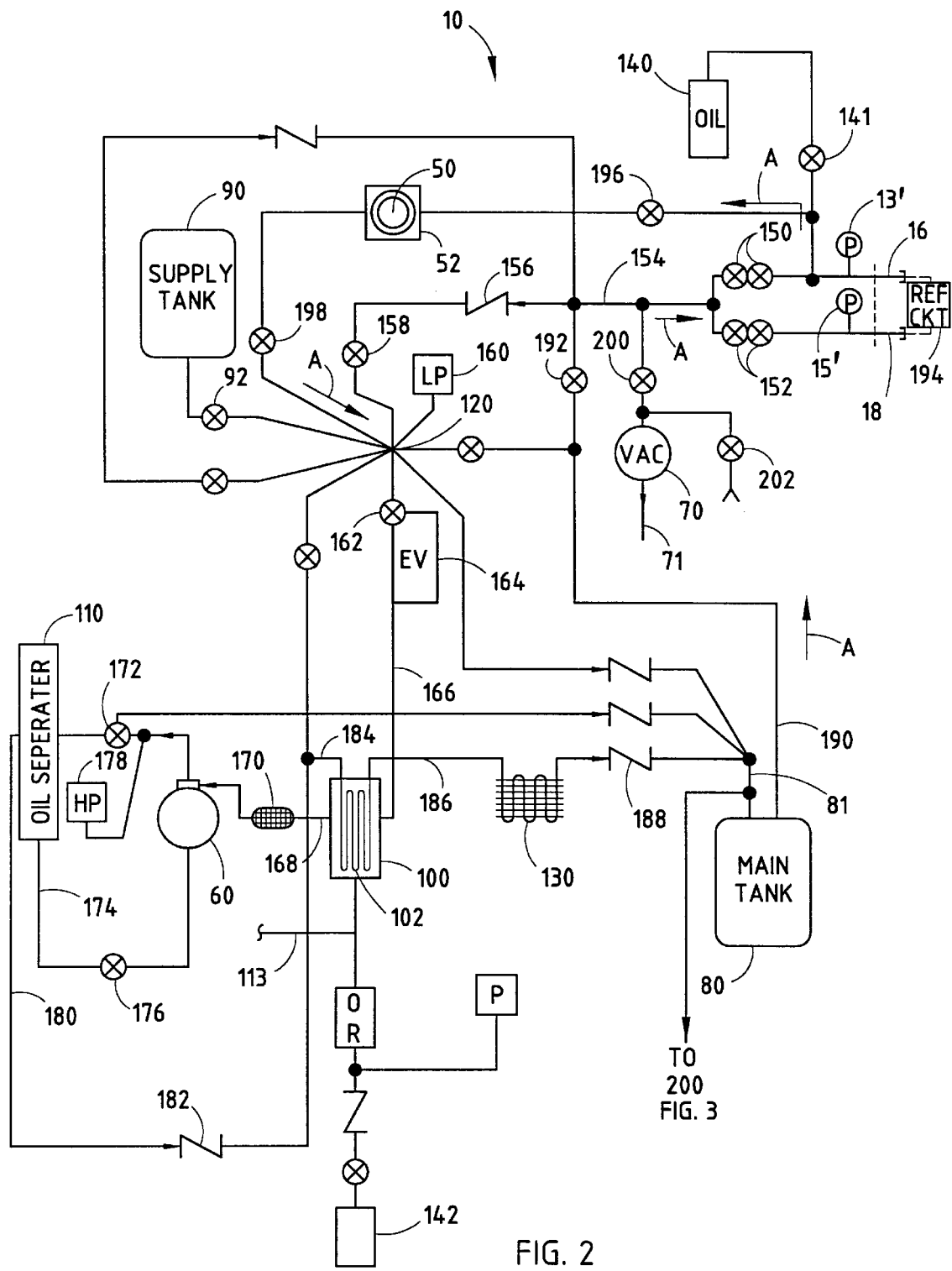
FIG. 2 is a flow diagram of the refrigerant recovery, flushing, evacuation, recharging, and purging system incorporated in the system shown in FIG. 1.
Figure 3:
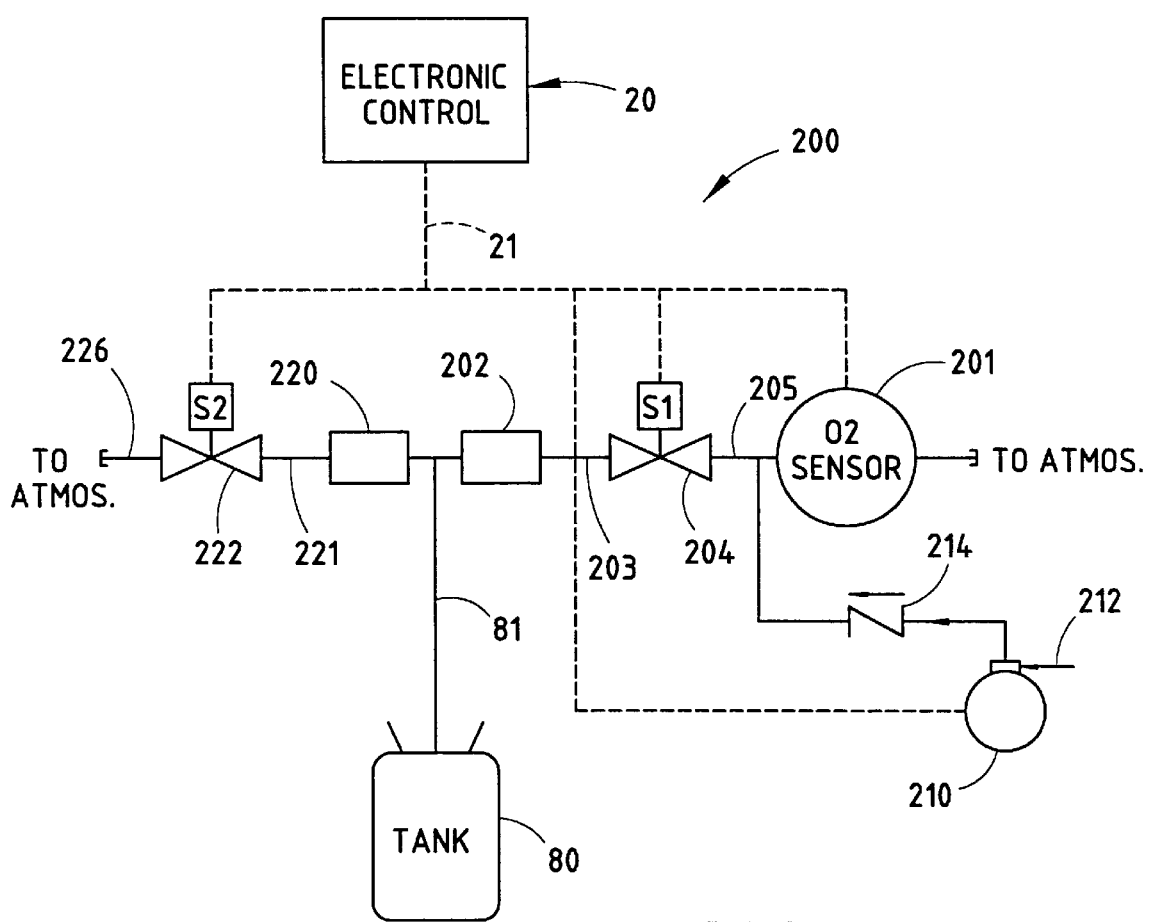
FIG. 3 is a flow diagram of the air purge system integrated into the maintenance unit of FIGS. 1 and 2.

The maintenance unit 10 includes an electronic control circuit 20 (FIGS. 1 and 3) integrally including a microprocessor on a circuit board 22 for controlling the electromechanical solenoid valves shown in the flow diagrams of FIGS. 2 and 3 and for receiving input information from the various system pressure sensors as well as the control switches included on the control panel 30 shown in FIG. 1. The control panel 30 includes an on/off switch 31 and a display 32 for displaying the operational status of the machine operation, which display may be an LCD display or other suitable electronic display coupled to the microprocessor via a conventional input/output circuit. The display panel 30 further includes a switch panel 34 having a conventional keyboard 35 and a plurality of push-button switches 36 for controlling the operation of the machine through its various phases of operation and/or for selecting parameters for display. Thus, the keyboard 35 in conjunction with the operational switches 36 and display 32 allow the operator to enter the desired operational parameters for the machine according to manufacturer specifications for the servicing, for example, of an air conditioner unit in a particular vehicle.

The input hoses 16 and 18 are coupled to mechanical pressure gauges 13 and 15, respectively, which are mounted on the front panel of the service unit 10, as seen in FIG. 1. In addition, electrical pressure transducers 13' and 15' are coupled to the hoses 16 and 18, as shown in FIG. 2, and are coupled to the microprocessor through conventional input/output circuits to provide the microprocessor with pressure information during operation of the unit. Gauges 13 and 15 provide the operator with a conventional analog display of the pressure as well. Mounted to the top surface 33 of cabinet 12 is a sight gauge 50 which also includes an integral replaceable filter cartridge 52 mounted to the cabinet for filtering particulate material from the refrigerant during the flushing cycle as described in greater detail below.

A compressor 60 and a vacuum pump 70 are mounted to the floor 35 of cabinet 12. A main tank 80 and an auxiliary supply tank 90 of refrigerant (FIG. 2) for the supply of refrigerant to the system are mounted behind the front of cabinet 12 on an extension of floor 35. The secondary supply tank 90 supplies make-up refrigerant to the main tank 80 as described in connection with the concurrently filed, copending application entitled BACKGROUND TANK FILL, Ser. No. 09/272,789, filed concurrently herewith the disclosure of which is incorporated herein by reference. Mounted to the rear wall 36 of cabinet 12 is an oil accumulator tank 100, a compressor oil separator filter 110, a manifold 120 shown as a node in FIG. 2, and a condenser 130. In addition, a fresh oil canister 140 is mounted within a side compartment of cabinet 12 and a recovery oil container 142 is mounted on the lower part of the cabinet to receive oil drained from the accumulator 100.

The electronic module 20 and the purging circuit 200 (FIG. 3) are also mounted within cabinet 12. Circuit 200 includes a commercially available oxygen sensor 201 coupled to the return conduit 81 of the main supply tank 80 of refrigerant through a first orifice 202 and solenoid control valve 204. A conduit 203 couples orifice 202 to valve 204 while an additional conduit 205 couples the valve to the input of oxygen sensor 201. Also coupled to the input of oxygen sensor 201 is an air pump 210 having an inlet 212 for receiving atmospheric pressure air. Air pump 210 has an output coupled through check valve 214 to the input conduit 205 of oxygen sensor 201 for the calibration of the oxygen sensor as described in greater detail below. Air pump 210, solenoid control valve 204 and oxygen sensor 201 are coupled to the electronic control and its microprocessor as shown by dotted lines 21 indicating the conventional electrical interconnections in FIG. 3. Additionally coupled to return line 81 of tank 80 is a second orifice 220 which is coupled to a second solenoid control valve 222 by conduit 221. Valve 222 has an output 226 for bleeding air from tank 80 to the atmosphere.

Orifice 202 comprises a flow restricting orifice having a diameter in the preferred embodiment of from about 0.004 inches to 0.008 inches and preferably about 0.006 inches to allow the relatively slow flow of air through the oxygen sensor 201 during the sensing portion of a purging cycle of operation described below. Orifice 220, on the other hand, has a somewhat larger diameter preferably of from about 0.015 inches to approximately 0.025 inches and in the preferred embodiment 0.020 inches to allow, under the control of circuit 20, the purging of detected air for a predetermined period of time as necessary. The air pump 210, oxygen sensor and valves are mounted within cabinet 12 in a conventional manner and are not visible in FIG. 1 but only shown in FIG. 3. Having briefly described the major components of the refrigerant servicing unit 10 shown in FIGS. 1–3, a more detailed description of the system follows in connection with the FIG. 2 diagram, followed by the specific operation of the air purging cycle as described in connection with FIG. 3.

Initially, the hoses 16 and 18 are coupled to the vehicle and the recovery cycle is initiated by the opening of the dual back-to-back high pressure and low-pressure solenoids 150, 152, respectively. This allows the refrigerant within the vehicle's air conditioning system to flow through conduits 154 through check valve 156 and recovery valve 158 into the manifold 120. A low pressure switch 160 senses the pressure and provides an output signal coupled to the microprocessor through a suitable interface circuit which is programmed to detect when the pressure has recovered refrigerant down to 13 inches of mercury. The refrigerant then flows through valve 162 and expansion chamber 164 via conduit 166 into the accumulator 100 where it travels through an output conduit 168 through a water separating molecular sieve 170 to the input of compressor 60. Compressor 60 draws the refrigerant through the compressor into a valve 172 and through an oil separating filter 110 for the compressor which circulates oil back to the compressor through conduit 174 and oil return valve 176. A pressure transducer 178 is coupled to the microprocessor which is programmed to determine the upper pressure limit of, for example, 435 psi, to shut down the compressor in the event the pressure becomes excessive. The compressed refrigerant exits the oil separator through conduit 180, through check valve 182, and into a heating coil 102 in accumulator 100 via conduit 184. The heated compressed refrigerant flowing through coil 102 assists in maintaining the temperature in accumulator 100 within a working range. The refrigerant then flows through conduit 186 to the condenser 130 that cools the compressed refrigerant which next flows through check valve 188 and into the main tank 80 through conduit 81.

Subsequent to this recovery process, the automatic flushing cycle is initiated. The flow path for the flushing cycle comprises conduit 190 extending from a dip tube in the main refrigerant storage tank 80 in a direction indicated by arrow A in FIG. 2. The flow path continues through the charging valve 192, which is opened for purposes of flushing the system, through conduit 154 in the direction indicated by arrow A in FIG. 2, through the low pressure hose 18 by the opening of solenoid valves 152 and into the vehicle's refrigerant system indicated schematically by block 194. The flow returns through the high pressure hose 16 then, as indicated by arrow A, through the now-opened flush valve 196, through the sight gauge 50 and its filter 52, and through the second flush valve 198 and into manifold 120. From there, the refrigerant follows the same path through the accumulator 100 as described above in connection with the recovery cycle to finish in the main tank 80. During this flush cycle, which is programmed for a default time of 30 minutes, the filter 52 associated with the sight gauge removes any particulate material while the molecular sieve 170 removes water particles and accumulator 100 removes waste oil, thus resulting in a vehicle system with clean refrigerant therein.

Once the flushing cycle has been completed, the evacuation cycle begins by the opening of solenoids 150 and 152 and valve 200, leading to the input of vacuum pump 70. Prior to opening valve 200, air intake valve 202 is opened, allowing the vacuum pump to start up exhausting air through outlet 71. The vehicle system 194, which is at a relatively low pressure at the end of the flush cycle is then evacuated by the closing of valve 202 and the opening of valve 200, allowing the vacuum pump 70 to exhaust any trace gases remaining until the pressure is approximately 29 inches of mercury. When this occurs, as detected by pressure transducers 13' and 15' coupled to the microprocessor, the microprocessor actuates valve 200 turning it off and the recharging cycle is begun as now described.

The flow path of the recharging cycle is part of the flush cycle in which charge valve 192 is opened as are solenoids 150 to allow the liquid refrigerant in tank 80, which is at a pressure of approximately 70 psi or above, to flow through conduit 154. The flow is in the direction indicated by arrow A through high-pressure solenoids 150 for a period of time programmed to provide a full charge of refrigerant to the vehicle. A more detailed description of the flushing cycle is described in the above-identified U.S. patent application Ser. No. 09/272,868, filed Mar. 19, 1999, entitled REFRIGERANT RECOVERY AND RECHARGING SYSTEM WITH AUTOMATIC FLUSHING.

With this system, a vehicle's air conditioning system can be serviced by having its refrigerant removed, filtered and recycled into the refrigerant tank 80. The system is then flushed utilizing the cleaned refrigerant; and ultimately recharged with refrigerant and new oil is injected as necessary from oil supply 140. The flushing process is automatically initiated by the control of the valves in the system such that once the hoses are coupled to the vehicle's air conditioning system, no further equipment is necessary or operator intervention other than to initiate the flushing sequence.

While connecting and disconnecting hoses to vehicles to be serviced and when, as becomes necessary upon occasion, the auxiliary supply tank 90 must be disconnected and a fresh supply of refrigerant connected, air enters the flow path of refrigerant in the system 10 and, if not removed from the main tank 80 to which it migrates, can contaminate the refrigerant being supplied to a refrigeration circuit being serviced. In order to remove any air collected in the main tank 80, the integrated and automatic air purging system 200 shown in FIG. 3 is employed and operates under the control of the microprocessor as now described.

The microprocessor 20 is coupled to the various control solenoids, as shown in FIGS. 2 and 3, through interface circuits and conductors which are shown in dotted lines 21 in FIG. 3 with respect to the air purging system. The microprocessor is programmed to conduct an air purge cycle of operation when the unit is not in a normal operating cycle of recovering, flushing, and recharging a refrigeration circuit. Thus, when the system has completed such a normal use cycle, the oxygen sensor 201 is activated, as is pump 210, to first pass a sample of ambient air through the test chamber of the oxygen sensor for calibrating the sensor in order to compensate for sensor life as well as varying ambient operating conditions. Subsequent to the calibration step which is achieved from the normal operation of the commercially available oxygen sensor unit 201, microprocessor 20 sends a signal which opens solenoid valve 204, allowing a sample from the top of refrigerant supply tank 80 to pass through conduit 81 through orifice 202, valve 204, and into the oxygen sensor 201. Sensor 201 detects the existence and relative amount of any oxygen or nitrogen in the sample from tank 80 and provides a signal to microprocessor 20 through bus 21 to determine whether the amount of oxygen or nitrogen (i.e., air), is greater than a predetermined level. In the preferred embodiment of the invention, the predetermined level constitutes two percent of the sampled gas and, if such level is reached or exceeded, the microprocessor is programmed to close valve 204 subsequent to the sampling and open solenoid valve 222, allowing the gas to escape tank 80 through conduit 81, orifice 220 and valve 222 to the atmospheric vent 226. Orifice 220 allows the air to escape at a reasonable rate, while limiting the flow to prevent the pressure in tank 80 from dropping rapidly which would result in excessive refrigerant loss. The purging time is selected to be about 15 seconds.

Subsequent to the opening of valve 222 for a predetermined time period to allow the air to escape from the refrigerant supply 80, valve 204 is again opened to allow resampling through the oxygen sensor 201 to determine whether the amount of air has been sufficiently reduced to below the predetermined limit of two percent. If necessary, another purge cycle is conducted, and the sampling and purging is repeated as necessary to lower the air in tank 80 to below two percent.

If refrigerant has been added to the tank during the background tank fill sequence as described in the above-identified patent application Ser. No. 09/272,789, entitled BACKGROUND TANK FILL, this operation is recognized by the microprocessor during the operation of valve 92 in FIG. 2 by the microprocessor, and the sampling and purging sequence is initiated. Also, the sequence is initiated 15 minutes after a cycle of recovery flushing and recharging of a refrigerant circuit has occurred. If no excessive air is in tank 80 after five samples have been taken, the tank will not be resampled until refrigerant has been added to the tank.

One advantage of the system of the present invention, which is integrated within the service unit 10, is that it allows the refrigerant in tank 80 to be sampled when the service unit is not in operation servicing a refrigerant circuit. Further, the air purging system can be used with any type of refrigerant for any type of refrigerant servicing unit without requiring operator control or input. The system, therefore, allows for the automatic purging air from the refrigerant supply tank in a cost effective, accurate manner to assure the supply of refrigerant is not contaminated.

It will become apparent to those skilled in the art that various modifications to the preferred embodiments of the invention as described herein can be made without departing from the spirit or scope of the invention as defined by the appended claims.

The invention claimed is:

1. A purging system for purging contaminants from a refrigerant supply tank in a refrigerant circuit servicing unit comprising:

a supply tank of refrigerant;

a contaminant gas sensor;

a first conduit coupled to said supply tank and to said contaminant gas sensor, said conduit including a first flow restrictor and an electrically actuated first control valve;

a supply of gas coupled to said gas sensor for calibration of said gas sensor;

a second conduit coupled to said supply tank, said second conduit including a second electrically actuated valve and a second flow restrictor for bleeding contaminant gas from said refrigerant supply tank; and an electrical control circuit coupled to said first and second valves and to said gas sensor for receiving signals from said gas sensor indicating the level of contaminant gas present in said supply tank and for selectively controlling said first and second control valves for sampling of gas from said supply tank and subsequently purging contaminant gas from said supply tank through said second flow restrictor when the detected level of contaminant gas is above a predetermined level.

2. The system as defined in claim 1 wherein said first flow restrictor has an orifice having a diameter of from about 0.004 inches to about 0.008 inches.

3. The system as defined in claim 2 wherein said first flow restrictor orifice has a diameter of about 0.006 inches.

4. The system as defined in claim 1 wherein said second flow restrictor has an orifice having a diameter of from about 0.015 inches to about 0.025 inches.

5. The system as defined in claim 4 wherein said second flow restrictor orifice has a diameter of about 0.020 inches.

6. The system as defined in claim 1 wherein said first and second valves are solenoid valves.

7. The system as defined in claim 1 wherein said supply of gas for calibration includes a pump for pressurizing said gas.

8. The system as defined in claim 7 wherein said contaminant gas includes air.

9. The system as defined in claim 8 wherein said pump includes and air inlet exposed to ambient air and an outlet and wherein said outlet is coupled to said first control valve.

10. The system as defined in claim 1 wherein said control circuit includes a microprocessor programmed for actuating said first and second valves in sequence to sample gas in said supply tank and bleed contaminant gas from said tank.

11. An apparatus for servicing a refrigerant circuit comprising:

a supply tank of refrigerant;

a contaminant gas sensor;

a supply of gas coupled to said contaminant gas sensor for calibrating said gas sensor;

a first conduit coupled to said supply tank and to said contaminant gas sensor;

a second conduit coupled to said supply tank for bleeding gas from said refrigerant supply tank; and a control coupled to said first and second conduits for selectively allowing the sampling of gas from said supply tank and subsequently purging gas from said tank when the detected level of contaminant gas is above a predetermined level.

12. The apparatus as defined in claim 11 wherein said first conduit includes an electrically actuated valve for controlling the flow of fluid therethrough, said control including a control circuit, and wherein said valve is coupled to said control circuit for receiving opening and closing signals therefrom.

13. The apparatus as defined in claim 12 wherein said second conduit includes an electrically actuated valve for controlling the flow of fluid therethrough, and wherein, said second named valve is coupled to said control circuit for receiving opening and closing signals therefrom.

14. The apparatus as defined in claim 13 wherein said first and second conduits include flow restrictors.

15. A method of purging contaminants from a refrigerant supply tank in a refrigerant circuit servicing unit comprising:

providing a supply tank of refrigerant;

sampling gas from said supply tank through an electrically actuated first control valve, wherein said sampling step includes detecting the level of air in said supply tank, and wherein said detecting step includes placing an oxygen sensor in the flow path of sampled gas;

purging gas from said supply tank through a second electrically actuated control valve when the sampled gas includes a contaminant gas above a predetermined level; and electrically controlling said first and second valves to sample gas from said supply tank and purge gas from said tank.

16. The method as defined in claim 15 wherein said detecting step further includes calibrating said oxygen sensor.

17. A system for servicing a refrigerant circuit comprising:

first and second hoses for connection to a refrigerant circuit to be service;

a supply tank of refrigerant;

a recirculating pump coupled to said hoses and to said tank for withdrawing refrigerant from the circuit being serviced and introducing the withdrawn refrigerant into said tank, wherein the improvement comprises:

a contaminant gas sensor;

a first conduit coupled to said supply tank and to said contaminant gas sensor, said conduit including a first flow restrictor and an electrically actuated first control valve;

a supply of gas coupled to said gas sensor for calibration of said gas sensor;

a second conduit coupled to said supply tank, said second conduit including a second electrically actuated valve and a second flow restrictor for bleeding contaminant gas from said refrigerant supply tank; and an electrical control circuit coupled to said first and second valves and to said gas sensor for receiving signals from said gas sensor indicating the level of contaminant gas present in said supply tank and for selectively controlling said first and second control valves for sampling of gas from said supply tank and subsequently purging contaminant gas from said supply tank through said second flow restrictor when the detected level of contaminant gas is above a predetermined level.

18. The system as defined in claim 17 wherein said first flow restrictor has an orifice having a diameter of from about 0.004 inches to about 0.008 inches.

19. The system as defined in claim 18 wherein said first flow restrictor orifice has a diameter of about 0.006 inches.

20. The system as defined in claim 19 wherein said second flow restrictor has an orifice having a diameter of from about 0.015 inches to about 0.025 inches.

21. The system as defined in claim 20 wherein said second flow restrictor orifice has a diameter of about 0.020 inches.

22. The system as defined in claim 21 wherein said first and second valves are solenoid valves.

23. The system as defined in claim 22 wherein said supply of gas for calibration includes a pump for pressurizing said gas.

24. The system as defined in claim 23 wherein said contaminant gas includes air.

25. The system as defined in claim 24 wherein said pump includes and air inlet exposed to ambient air and an outlet and wherein said outlet is coupled to said first control valve.

26. The system as defined in claim 25 wherein said control circuit includes a microprocessor programmed for actuating said first and second valves in sequence to sample gas in said supply tank and bleed contaminant gas from said tank.

* * * * *